Patented Sept. 23, 1924.

1,509,166

UNITED STATES PATENT OFFICE.

JOHN HARRY MOORMAN AND WALTER EMERSON HOWE, OF DENVER, COLORADO.

KEROSENE-OIL LIVESTOCK DIP.

No Drawing.  Application filed August 6, 1923.  Serial No. 656,129.

*To all whom it may concern:*

Be it known that we, JOHN HARRY MOORMAN and WALTER EMERSON HOWE, citizens of the United States, residing at Denver, in the county of Denver and State of Colorado, have invented a new and useful Kerosene-Oil Livestock Dip, of which the following is a specification.

The object of our invention is to emulsify kerosene oil so that it may be applied in various dilutions to live stock, either in the form of a dip, spray, or for hand application to kill parasites living upon them.

Our composition, or kerosene oil live stock dip, consists of oleic acid (commercial red oil), denatured alcohol, aqua ammonia, and kerosene oil.

In preparing the stock solution for this kerosene oil live stock dip, we prefer to use the ingredients in the following proportions,—viz, oleic acid (commercial red oil) thirteen parts; completely denatured alcohol, nine parts; aqua ammonia, three parts.

These ingredients should be combined by mixing the oleic acid (commercial red oil) and the denatured alcohol; after these two are thoroughly mixed, add the aqua ammonia, and mix thoroughly; then add the kerosene oil in the proportion of four parts kerosene oil to one part of the combination formed by oleic acid, alcohol, and ammonia. This is the stock solution with which various dilutions of kerosene oil may be made by adding sufficient water to produce the percentage of kerosene oil desired in the final dip for application to live stock.

To produce the best result, the oleic acid should be of the grade known as "commercial red oil"; the denatured alcohol should be that classified as "completely denatured alcohol"; the ammonia should be "commercial aqua ammonia," twenty-six degrees Baumé. Good results may be obtained, however, if the ingredients vary slightly from the above specifications.

The resulting combination should be a clear brown liquid after making the mixture as specified. The stock solution may be diluted with water to make any strength of kerosene oil from five per cent to twenty per cent, and, if the mixture is properly made, and the ingredients are of the quality and strength described herein, a perfect, permanent emulsion will result without the separation of kerosene from the other ingredients.

The kerosene oil live stock dip herein specified may be applied to the domestic animals by means of a dipping vat, spray, or hand treatment, at any strength from five per cent to twenty per cent kerosene oil; the five per cent is weak enough to not injure the animals, and the twenty per cent strength is strong enough to kill the parasites. The strength to use should vary for the different animals as well as for the parasite to be killed.

It has been known for many years that kerosene oil is an effective remedy to apply upon domestic animals to kill lice and scab-mites which are often found upon them. This statement is attested by reference to the United States Bureau of Animal Industry Circular No. 89, dated December 15, 1905; but, the difficulty in using kerosene oil is that if used without diluting, the skin of the animal will be blistered and excoriated, thereby causing injury to the animal. You are again referred to U. S. B. A. I. Circular 89, to the statement in the first paragraph on page two,—for verification of this statement.

Previous to our combination, or mixture, no satisfactory method for diluting kerosene oil was known. Many emulsions of kerosene oil have been made by means of laundry soap, but no emulsion has previously been made in which the kerosene oil will not separate when agitation is stopped. An emulsion in which the kerosene separates can not be evenly applied to the domestic animals.

In dipping animals for lice or mange, two dippings or more are required at present, with stated intervals, and a certain degree of heat,—as shown by United States Department of Agriculture Farmer's Bulletin No. 1017—December, 1918; page nine, page thirteen, page twenty-one; and United States Dept. Agri. Farmer's Bulletin No. 909, page eight: while, with our mixture, only one dipping is necessary and no heat whatever required.

Crude petroleums have been used for treating animals for lice and mange, but kerosene oil is that portion of the crude petroleum which has the killing power. For reference to use of crude petroleum, kindly refer to U. S. B. of A. I. Circular No.

89, U. S. Dept. Agri. Farmer's Bulletin, 152, pages 30 and 31; U. S. Dept. Agri. Farmer's Bulletin 1017, page 21,—U. S. Dept. Agri. Farmer's Bulletin 1085, page 18.

We claim:

1. An insecticide comprising a mixture of oleic acid, alcohol ammonia and a hydrocarbon oil.

2. An insecticide comprising an emulsion composed of oleic acid, alcohol ammonia and a hydrocarbon oil.

3. An insecticide comprising a mixture of oleic acid, alcohol ammonia and kerosene.

4. An insecticide comprising a mixture of sustantially thirteen parts of oleic acid, nine parts of alcohol and three parts of ammonia combined with a hydrocarbon oil.

5. An insecticide comprising a mixture of substantially thirteen parts of oleic acid, nine parts of alcohol and three parts of ammonia combined with kerosene in the proportion of substantially four parts of kerosene to said mixture.

6. An insecticide comprising a mixture of commercial red oil, denatured alcohol, commercial aqua ammonia and kerosene.

7. An insecticide comprising a permanent emulsion of commercial red oil, denatured alcohol, commercial aqua ammonia and kerosene.

8. The method of compounding an insecticide emulsion consisting in first mixing together oleic acid and alcohol, adding to said mixture ammonia and mixing the same thoroughly and thereafter adding a hydrocarbon oil.

9. The method of compounding an insecticide emulsion consisting in first mixing together sustantially thirteen parts of oleic acid and substantially nine parts of alcohol, adding to said mixture substantially three parts of aqua ammonia and mixing the same thoroughly and thereafter adding to the mixture, kerosene in substantially the proportion of four parts of kerosene to the aforesaid mixture.

In testimony whereof we affix our signatures to this specification in the presence of two subscribing witnesses.

JOHN HARRY MOORMAN.
WALTER EMERSON HOWE.

Witnesses:
ELMO HUFF,
E. CLAIRE ANDERSON.